(12) United States Patent
Shuster

(10) Patent No.: US 7,916,581 B2
(45) Date of Patent: Mar. 29, 2011

(54) OPTICALLY-READABLE DISK WITH COPY PROTECTION DEVICE

(76) Inventor: Gary Stephen Shuster, Fresno, CA (US)

( * ) Notice: Subject to any disclaimer, the term of this patent is extended or adjusted under 35 U.S.C. 154(b) by 0 days.

(21) Appl. No.: 12/891,527

(22) Filed: Sep. 27, 2010

(65) Prior Publication Data

US 2011/0013503 A1    Jan. 20, 2011

Related U.S. Application Data

(63) Continuation of application No. 12/167,655, filed on Jul. 3, 2008, now Pat. No. 7,804,744, which is a continuation-in-part of application No. 11/744,123, filed on May 3, 2007.

(51) Int. Cl.
*G11B 11/00* (2006.01)
*G11B 7/24* (2006.01)

(52) U.S. Cl. ............... 369/13.35; 369/275.3; 369/288

(58) Field of Classification Search ............... 369/13.35, 369/275.3, 288, 13.38, 13.39, 30.09, 30.04, 369/283, 53.21
See application file for complete search history.

(56) References Cited

U.S. PATENT DOCUMENTS

| | | | |
|---|---|---|---|
| 5,338,625 A * | 8/1994 | Bates et al. | 429/322 |
| 5,558,957 A * | 9/1996 | Datta et al. | 429/127 |
| 5,787,068 A | 7/1998 | Arps et al. | |
| 5,832,088 A | 11/1998 | Nakajima et al. | |
| 6,266,299 B1 | 7/2001 | Oshima et al. | |
| 6,597,648 B1 | 7/2003 | Yeo et al. | |
| 7,039,927 B2 | 5/2006 | Constantinou et al. | |
| 7,142,075 B1 * | 11/2006 | Roesler et al. | 335/78 |
| 7,804,744 B2 * | 9/2010 | Shuster | 369/13.35 |
| 2001/0046204 A1 | 11/2001 | Rollhaus et al. | |
| 2003/0149885 A1 | 8/2003 | Fang et al. | |
| 2003/0179663 A1 | 9/2003 | Tomita | |
| 2003/0185128 A1 | 10/2003 | Shoji et al. | |
| 2004/0022542 A1 | 2/2004 | Atkinson | |
| 2005/0169145 A1 | 8/2005 | Yumiba et al. | |
| 2006/0268661 A1 | 11/2006 | Ferren et al. | |
| 2007/0097837 A1 * | 5/2007 | Marshall et al. | 369/116 |

FOREIGN PATENT DOCUMENTS

JP    8-55342    2/1996

* cited by examiner

*Primary Examiner* — Ali Neyzari
(74) *Attorney, Agent, or Firm* — Connolly Bove Lodge & Hutz LLP; Jonathan A. Jaech

(57) ABSTRACT

An optically-readable disk includes a device that disrupts readability of the disk when the disk is spun at an angular velocity substantially greater than required to play the disk in its intended playing device, or when a defined integral of velocity and time is exceeded. The device may include a fluid container that disperses a data-disruptive fluid. The device may include a membrane or layer that is disrupted when the disk is rotated above a defined angular velocity, or when a defined integral of velocity and time is exceeded. The device may include an electro-optical material that is activated by an electrical signal from a controller in response to an input from a sensor responsive to motion of the disk.

26 Claims, 4 Drawing Sheets

OPTICALLY-READABLE DISK WITH COPY PROTECTION DEVICE

RELATED APPLICATIONS

The present application is a continuation of U.S. application Ser. No. 12/167,655, filed Jul. 3, 2008, now U.S. Pat. No. 7,804,744, which is a continuation-in-part of application Ser. No. 11/744,123, filed May 3, 2007, the entirety of which applications are incorporated herein by reference.

BACKGROUND

1. Field of the Invention

The present invention relates to an optically readable disk designed to inhibit access of encoded content under defined mechanical conditions, such as, for example, by being rendered unreadable when the disk is spun at speeds higher than the disk's standard playback speed.

2. Background

Optically-read disks present a common and popular way of storing data and other content. Specifically, consumer entertainment content in the form of movies, music and other media are commonly recorded on disks and sold to consumers. Optically-read disks include, for example, audio CDs, CD-ROMs, DVDs, HD-DVDs, and Blu-Ray disks.

Unfortunately, the content recorded on optically-read disks can be illegally reproduced in violation of copyright laws. Such unauthorized reproduction is especially widespread due to the increasing availability and affordability of equipment used to reproduce the content recorded on an optically-read disk.

There have been various attempts to inhibit such copying, the majority of which focus on various encryption methods designed to prevent copying. In addition, some optical disks may be protected by means of noncontiguous data files separated by barriers designed to interrupt a disk player's reading of the disk.

Previous security devices and techniques aimed at preventing the illegal copying of protected content recorded on optically-readable disks, besides being expensive to implement, have focused on methods to overcome, and stay one step ahead of, disk player and disk recording technology. Unfortunately, as the security features implemented to prevent illegal copying becomes more sophisticated, they are quickly rendered obsolete due to the continuing and rapid advancement of disk recording technology. Accordingly, there is a need for an optical disk having a copy protection feature which overcomes the aforementioned deficiencies of the prior art.

SUMMARY

The present invention is directed to an optically-readable disk having protection against unauthorized reproduction of the data recorded on the disk.

When a user inserts a disk into a disk player for viewing of the data, the disk player spins the disk at a speed sufficient to enable the disk player to read the data so the user can view the content recorded on the disk. A typical commercially-available disk player intended solely for the purpose of viewing disk content, for example, a DVD player that is connected to a television, reads the disk at the slowest speed possible for playback and viewing.

Other disk players that are widely available, for example, those available as a component of a home computer system, routinely spin the disk at speeds much higher than what is required for the disk player to simply read the disk content for playback. These high speed disk players allow users, in conjunction with disk recording hardware, to copy the disk content in a much shorter time period than what would be required if the user were to attempt to copy the disk while the disk was spinning at the slower playback speed.

Accordingly, if a user wished to make a copy of a disk, the user would naturally use a readily available and inexpensive disk reader that would spin the disk at a higher rate of speed than the slower playback speed. This allows the user to copy the disk content in a much shorter time period. It also provides a user easy means to pirate copyrighted material by making multiple copies of the disk for illegal distribution. For example, it would take a copier two hours to copy a two hour movie recorded on a DVD where the disk was spinning at normal playback speed. However, a user could copy the same two hours worth of content in less than 10 minutes if the disk reader spun the disk at higher speeds.

The present technology is designed to frustrate a user's ability to copy the content of the disk by only allowing the disk to be read at the slower playback speed. If the disk is read at the faster "copying" speed, the disk is rendered unreadable and copying is thwarted.

In an embodiment, an optically-readable disk contains a small capsule or container attached to or embedded in its reading surface. The capsule or container is designed and attached to the disk so as not to interfere with a disk reader's reading of the disk and so as not to interfere with the stable spinning of the disk while being played. The capsule contains an obscuring compound such as ink or other opaque or reflective fluid. The capsule's membrane is constructed of a material that remains stable at low "read-only" or "playback" speeds. However, if the disk is inserted into a disk player and the disk is spun at speeds higher than the minimum speed necessary to read the disk and playback the disk content, the material of the capsule will disintegrate or otherwise destabilize. As a result, the capsule will fail and release its contents onto the reading surface of the disk, obscuring the reading surface and rendering the disk unreadable by the disk reader.

In another embodiment, a deformable membrane is attached to the reading surface of the disk in such a manner to permit reading of the disk at slow, playback speeds. When the disk is spun at speeds higher than the playback speeds, the membrane deforms. This prevents the disk content from being read by the disk reader.

In another embodiment, a deformable membrane is attached to either surface of the disk so as to permit reading of the disk at slow, playback speeds. However, when the disk is spun at speeds higher than the playback speeds, the membrane expands either above the surface of the disk or beyond the edges of the disk so as to physically interfere with the disk player's components, thus rendering the disk unplayable by the disk player.

In another embodiment, a thin membrane is adhered to the reading surface of the disk using an adhesive such that, when the disk spins in the disk reader at slow, playback-only speeds, the membrane remains uniformly adhered to the reading surface of the disk and does not interfere with reading data on the disk. However, if the disk player spins the disk at speeds higher than slow, playback-only speeds, the resulting forces may cause the adhesive to fail or introduce discontinuities in the membrane surface which causes the membrane to reflect or obscure the reading surface of the disk in a manner which renders the disk unreadable.

In other embodiments, an electro-optical material layer may be interposed between at least a portion of a data layer of the disk and the disk reading surface. An electro-optical material is a material having a least one optical property that changes in response to an electrical signal; for example, transparency, color, or reflectivity may change when a voltage or current is applied across the material. Examples of electro-optic materials that may be used in a disk layer may include, without limitation, liquid crystal materials and electrochromic films and gels. The electro-optical layer may be configured such that, when activated by an electrical signal, the electro-optical layer renders the optical data layer unreadable by an optical disk reader. The electro-optical layer may be restored to a deactivated state thereby restoring readability to the data layer by applying a second electrical signal, stopping the electrical signal, passively by passage of time, or some combination of the foregoing. The disk may further include a suitable sensor, such as an accelerometer, operatively associated with a controller disposed to apply an electrical signal to the electro-optical layer. When the controller receives a signal from the sensor indicating that the disk is rotating at a speed in excess of a maximum permitted angular velocity, or is accelerating in excess of a maximum permitted acceleration, the controller causes an electrical signal to be applied to the electro-optical layer, thereby rendering the disk temporarily or permanently unreadable.

A more complete understanding of the method and system for preventing the copying of an optically-readable disk will be afforded to those skilled in the art, as well as a realization of additional advantages and objects thereof, by a consideration of the following detailed description of various embodiments. Reference will be made to the appended sheets of drawings which will first be described briefly.

DETAILED DESCRIPTION

The present technology provides features that are particularly applicable to the prevention of the copying of optical disks, for example, CD, CD-ROM, DVD, DVD-ROM, HD-DVD, or Blu-Ray™ disks. Specifically, optical disks are primarily purchased (or rented) by users for playback of content encoded on the disk to produce audio-visual output on a user's television using a DVD, HD-DVD or Blu-Ray™ player, to produce music output on the user's music player, to play a game using the user's game player, and so forth. When used for this purpose, the receiving end-user player will spin the optical disk only at the slow, playback speed. If a user wishes to make an illegal copy of optical disk content, the user would insert the optical disk into a disk player that would spin the disk at speeds much faster than playback speeds used for simple viewing of the encoded disk content. In the detailed description that follows, like element numerals are used to indicate like elements appearing in one or more of the figures.

Figure 1A:
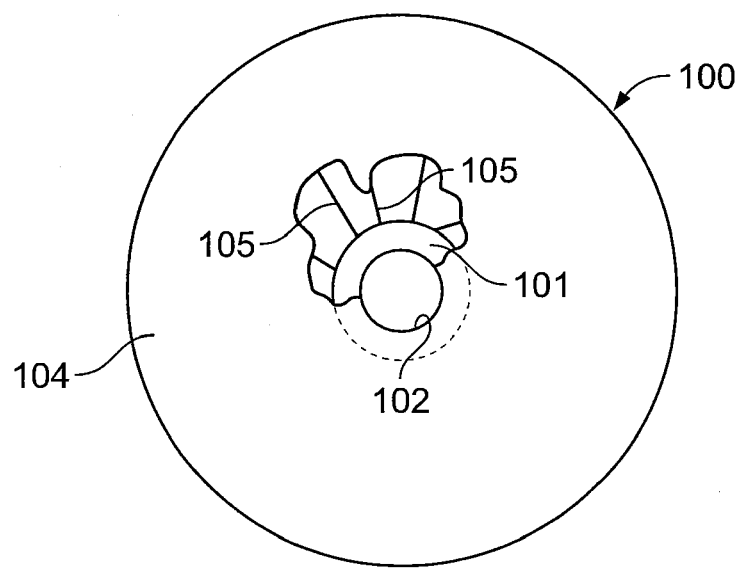
FIG. 1A is a breakaway plan view showing a planar structure of an optically-readable disk 100, according to a first embodiment showing the fluid containing container 101, attached to the disk surrounding the drive rotation hole, 102, of the disk.

FIG. 1A illustrates certain features according to an exemplary first embodiment. Specifically, it shows a planar structure of an optically-readable disk 100 with a toroid shaped container 101, attached to the center of the disk surrounding the drive rotation hole 102 of the disk. This embodiment permits a disk player to spin the disk without any interference from the container. This embodiment also permits the disk player to read the data reading area 104, without interference from the container. The data reading area 104 may include encoded digital data designed to be read by an optical pick-up device and decoded by a player to produce audio-visual, audio, or visual output for human consumption or to provide software for operation by a computer.

As used herein, a "readable" disk or area is one that may have its microscopic encoded digital data read by an optical pick-up device for use in an electronic player or computer. It should be apparent that optical disks may also include printed surfaces and labels designed to be read by the human eye; as used herein, a readable surface does not include these types of printed surfaces and labels.

Figure 1B:
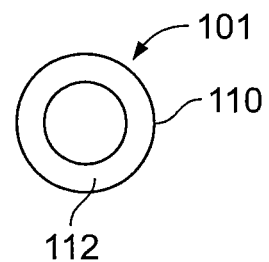
FIG. 1B is a planar view of the fluid containing container configured in a toroid shape to accommodate attachment of the container on the disk according to the first embodiment.
Figure 2:
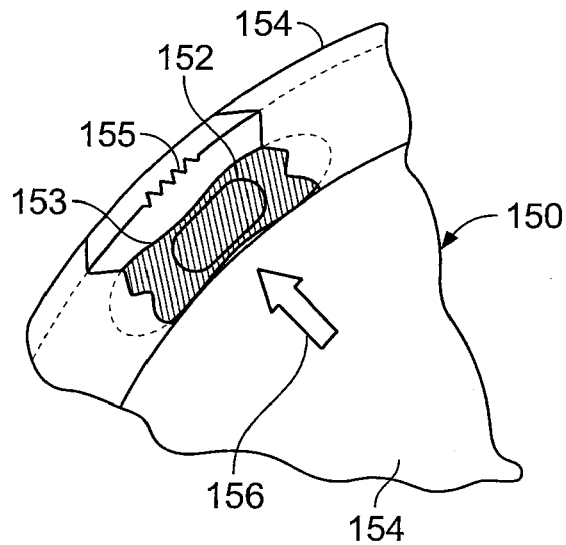
FIG. 2 is a breakaway plan view showing an alternative embodiment having a fluid-containing container located near the rim of an optically-readable disk.

When the container is subjected to angular velocities substantially greater than an angular velocity corresponding to a playback speed of the optical disk, the container may rupture, leak, or allow its contents to diffuse into an interior of the disk. The placement of the container 100 in this embodiment may allows for the container to be subject to such angular velocities upon the spinning of the disk substantially faster—for example, at least 50% or 100% faster—than needed for playing the disk in a CD player, DVD player, or the like. Also, in this embodiment, the placement of the container provides an effective means for the release and disbursement of the fluid 112 (as shown in FIG. 2) onto the data reading area upon the container membrane's 110 collapse (as shown in FIG. 1B). This disbursement of the fluid onto the data reading area thus interferes with the disk player's reading of the data recorded on the disk and therefore prevents copying of the data recorded on the disc.

Optionally, released fluid may be distributed into an interior of the disk via one or more transparent channels 105. Released fluid may comprise a gas or liquid. The released fluid may itself be opaque or reflective, or may cause a latent material distributed over a surface of the disk to become opaque or reflective. In the alternative, or in addition, the fluid may comprise a reactive material that reacts with materials in the disk's optically-readable layer to destroy or degrade readability of the disk, or the structural integrity of the disk. Preferably, the released liquid remains contained inside the disk after it is released from its container, or is of a nature so as to not harm adjacent people, devices, clothing, or the like, if released from the disk. Fluid-containing structures in an interior of a disk may be structured so that fluid of a certain viscosity will not flow into an area where data will be rendered unreadable unless the disk is spun for a prolonged period of time that is much longer than normal playing time, is spun at velocities exceeding normal playback velocity, or come combination of the foregoing. In addition, fluid-containing structures may be configured so that fluid will out of data areas to an origination region if the disk is handled in a certain fashion. For example, fluid may flow out of data areas if the disk is stored on edge for a prolonged period of time. Such a configuration may permit functioning of a disk to be restored after data is temporarily obscured.

FIG. 2 shows an alternative embodiment comprising a fluid 152 contained in a container 153 near an outer rim 157 of an optically-readable disk 150. Container 153 may be disposed adjacent a puncturing structure 155, which may comprise, for example, one or more small teeth or needles configured to puncture the container walls. When disk 150 is spun at normal playing speed, the centrifugal force acts on the container 153 in the direct indicated by arrow 156. However, the container and surrounding structures are configured such that the centrifugal force does not puncture or otherwise unseal the container. At substantially higher speeds, however, the container may be pressed against cutting teeth 155 or similar structure, releasing the fluid 152 into an interior of the disk, e.g., via a channel or partially open layer.

Figure 3:
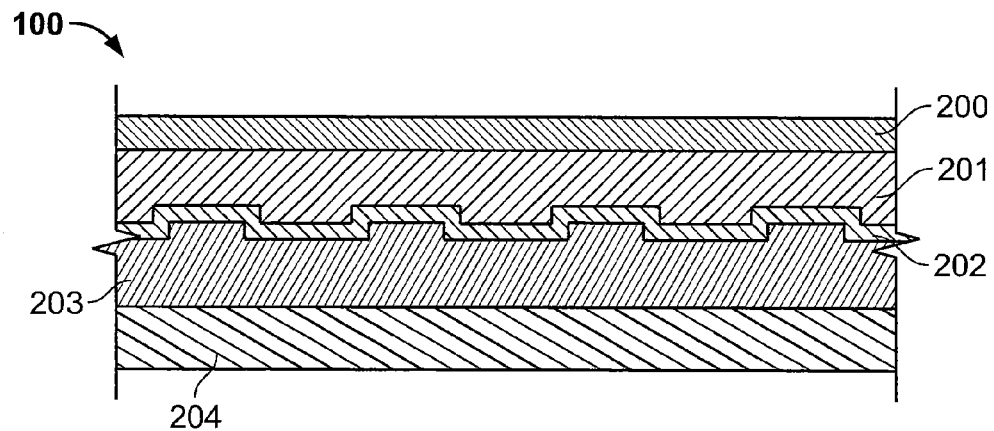
FIG. 3 is a sectional structure view of the optically-readable disk showing the plurality of layers of the disk, including a deformation layer according to an embodiment.

FIG. 3 shows a sectional structure of the disk in an alternative embodiment. Specifically, an optically-readable disc 100 may be generally constructed of a plurality of layers, including a top layer 200, which comprises the top of the disk, an optically-readable layer 201 upon which the data is recorded, as well as a reflective layer 202 and a transparent layer 204 both of which facilitate a disk player's reading of the data recorded on the optically-readable layer of the disk.

A deformation layer 203 may be interposed between the reflective layer and transparent layer. This deformation layer may be constructed of a material that is stables and permits a disk reader to read the data recorded on the optically-readable layer 201 when the disk is repeatedly spun at an angular velocity no greater than for normal playback in a consumer viewing device. When the disk is spun at an angular velocity substantially greater than the angular velocity required to read the data for playback in an end-user device, the deformation layer 203 may cavitate, crack, craze, deform, or otherwise alter its light-transmitting or reflecting properties, thereby disrupting or interfering with the disk reader's ability to read the data recorded on the disk. Based on this second preferred environment, the deformation layer can accomplish this disruption or interference by partially or entirely obscuring the optically-readable layer, which optically-readable layer is positioned behind the deformation layer. In addition, disruption of the reading of the disk can be accomplished by having the deformation layer deform or stretch beyond the edges of the disk thus causing physical interference with the disk reader.

Another embodiment has the deformation layer secured to either the bottom of the transparent layer 204 or top layer 200. In this embodiment, the deformation layer is configured so that when it deforms, it can expand beyond the physical boundaries of the disk. Again, the purpose of such deformation is to physically interfere with the disk reader and thus prevent the reading of the disk.

In an embodiment, the deformation layer may comprise an elastic material or a visco-elastic material with a shape memory. After deforming during excessively high-speed rotation, the layer may return to its original configuration after the disk stops spinning, such as by laying the disk on a flat surface. Restoration of the original shape may occur relatively quickly, for example, in less than one minute or less than one hour, or relatively slowly, for example, longer than one hour or longer than one day. In addition, or in the alternative, it may be possible to restore the deformation layer by exposure to a certain environment, for example, to an elevated temperature, infrared or ultraviolet radiation, or by exposure to a specific liquid or gas. This may permit the functioning of disks to be restored after a copy-protection feature is activated.

Figure 4:
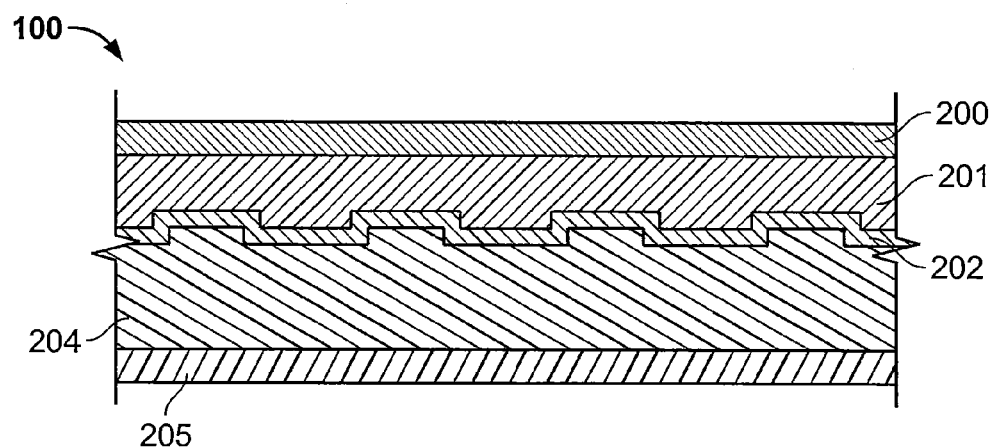
FIG. 4 is a sectional structure of an optically-readable disk according to a embodiment showing a membrane layer adhered to the disc.

FIG. 4 shows another alternative embodiment wherein a membrane layer 205 may be adhered to the transparent layer 204. The membrane layer may include an adhesive that is configured to bond the membrane layer to the transparent layer at slow, disk reading speeds. When the disk is spun at angular velocities substantially greater than the disk reading speed, the adhesive fails causing the membrane layer to separate from the transparent layer. Such separation may obscure the optically-readable layer 201 or will otherwise interfere with the disc reader's ability to read the data recorded on the optically-readable layer.

Whether a container with fluid or a deformation layer is used, the selectively-obscuring element should be more sensitive to centrifugal forces and less so to forces acting in other directions, for example, such as may arise from flexing the disk during handling or accidentally dropping the disk. A material, container, or device may be used that is not activated by impulses or forces acting for a relatively shorter periods of time. For example, in an embodiment, the disk may include an electronic, micro-mechanical, or fluidic device that integrates excess centrifugal force over time. Centrifugal force below a defined threshold and non-centrifugal forces may be ignored by the device, but centrifugal forces above a defined threshold are integrated over time until a triggering threshold is reached. For example, a micro-fluidic device may be configured such that centrifugal force above a defined threshold causes a fluid to flow through an orifice into a container. Surface tension of the fluid prevents flow when centrifugal force is below the threshold level. When the container is full, the device triggers activation of the obscuring device. Electrical or mechanical analogs of fluidic force-integrating devices may also be used.

The use of a force-integrating activation device may also be used to configure a disk so that it is rendered unreadable if spun even at relatively low velocities, i.e., normal playback speeds, for more than a defined period of time. For example, a disk could be designed to remain readable for a single play, or for any number of plays, after which it is rendered unreadable. However, because a force-time integral is used as the triggering factor, the disk may remain readable for any desired length of time under the control of the disk consumer, if it is not spun at all or is not spun for longer than the defined time.

Figure 5:
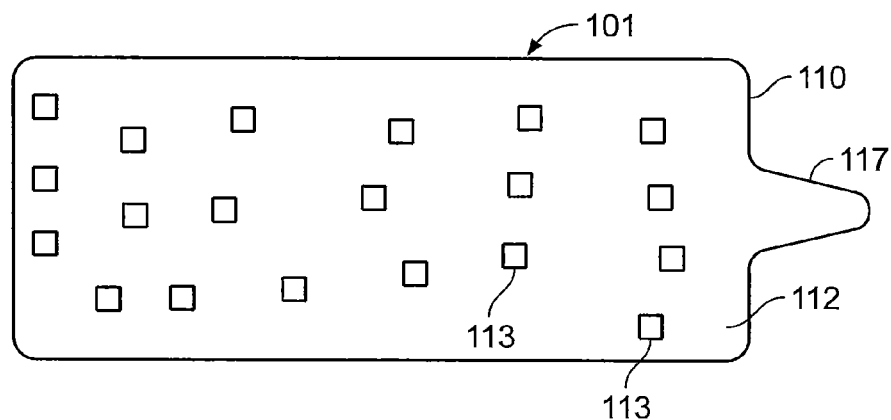
FIG. 5 is an enlarged view of a container showing the suspension of microspheres within the fluid contained in the container, configured to penetrate the container membrane when the container is subjected to sufficient centrifugal force.

FIG. 5 shows any exemplary structure of a container and contained fluid such as may be used in the embodiments exemplified by FIGS. 1A and 2, and that may be configured to integrate centrifugal force. Specifically, the container 100 may contain a fluid 102, such as an ink or solvent, configured for obscuring or otherwise rendering unreadable the reading surface of the disk upon its release from the container. Microspheres 103 may be suspended in the contained fluid, configured to degrade the membrane 101 of the container when they come in contact with the membrane. Under sufficient and sustained centrifugal force, sufficient numbers of microspheres should come into contact with the membrane, causing the membrane to rupture, leak or otherwise release the fluid onto the disk. Container 100 may be configured with one or more depressions or pockets 117 in the radial direction that gradually collect microspheres when the container is subjected to centrifugal force above a defined threshold. Below the threshold, the viscosity of fluid 102 may prevent migration of microspheres to the membrane walls. After a sufficient number of microspheres have collected near a membrane wall, the membrane may rupture, releasing fluid 102.

Figure 6:
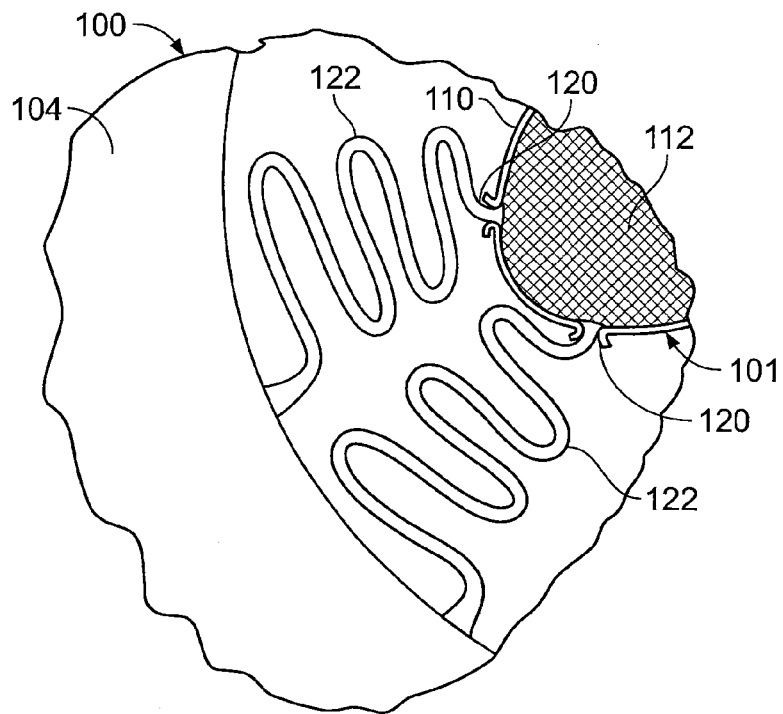
FIG. 6 shows an exemplary fluid container including a structure for fluidic integration of centrifugal force over time.

FIG. 6 shows a portion of an exemplary container 101 incorporating a fluidic structure configured to integrate centrifugal force over time. Container 101 may be located near or in the hub of an optically-readable disk 100, and may be generally toroid in shape. The fluidic structure may comprise one or more nozzles 120 or openings in the membrane wall 110. Fluid 112 and openings 120 may be configured such that, due to the surface tension and viscosity of fluid 112 and the configuration of each opening 120, the fluid will not pass out of the container thorough the opening unless the disk 100 is spinning at an angular velocity substantially greater than the normal playback velocity.

The fluidic structure may further comprise a channel 122 through which fluid 112 must pass before it reaches and corrupts the encoded-data portion 104 of disk 100. The channel may be provided between disk layers and be generally closed along its length and open at both ends. Any number of channels may be provided to allow for fluid communication between each opening and the encoded area 104. The channel may have any suitable cross-section, interior surface properties and length so as to slow droplets or steams of fluid passing through the opening and prevent fluid from reaching the encoded data until the disk 100 has been spun for a defined integral of angular velocity and time. For example, the channel may be designed so that fluid exiting the nozzles 120 does not reach the data area 104 until the disk has been spun for a period of time greater than, for example, one second, ten seconds, one minute, ten minutes, one hour, ten hours, or one-hundred hours at a normal playback velocity, and for correspondingly less time at greater velocities. Channel 122 may be provided in a linear, serpentine, labyrinth, coil, or any other desired course. It should be apparent that purely velocity-sensitive triggering devices and time-velocity sensitive devices may be combined in a single device.

In an embodiment, channel 122 and a fluid-containing portion of data area 104 may be configured so that fluid can flow back through the channel and into container 101 after it has been released. For example, the disk may include a funnel-shaped transition channel connecting a distal end of channel 122 to the data area 104. Fluid released into the data area may then be funneled back into the channel by setting the disk on edge, so that gravity acts to pull released fluid back into the channel and container. This may permit functioning of the disk to be restored after a release event. In this embodiment, nozzle 120 may permit bidirectional flow of fluid, i.e., in or out of container 101. In the alternative, nozzle 120 may be omitted.

Figure 7:
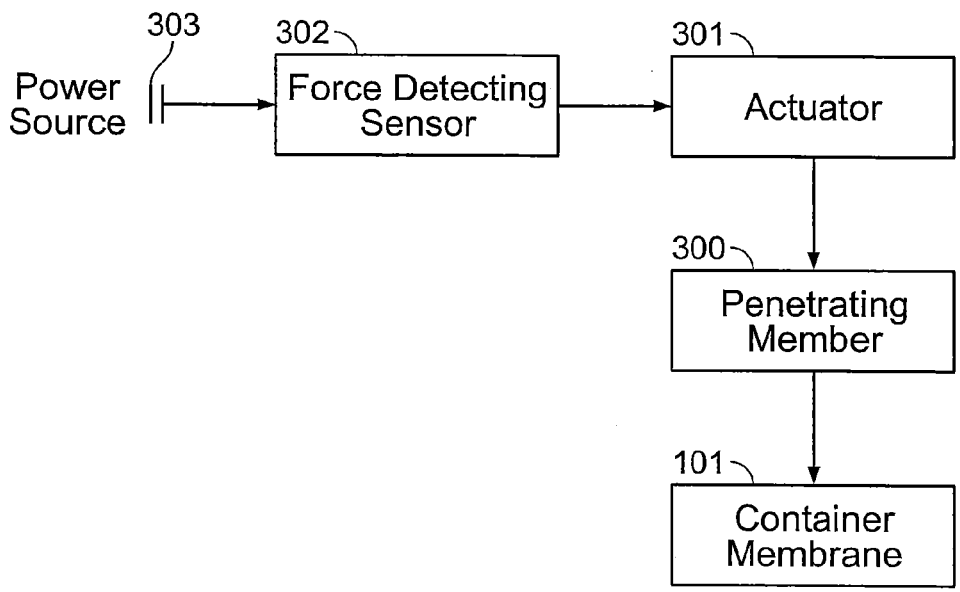
FIG. 7 is a block diagram showing a configuration for a circuit activated penetrating member attached to the container membrane and configured to pierce the container membrane upon the detection of sufficient, sustained centrifugal forces.

FIG. 7 provides an illustration, in the form of a block diagram, of an additional disk or method for causing the rupture of a fluid container or other activation of a data-corrupting system. Specifically, a circuit-activated penetrating member system comprising a power source 303, a force detecting sensor 302, an actuator 301 and penetrating member 300 may attached to the membrane 110 of a container 101. These elements may be incorporated into a very small electronic device and secured to the disk, for example, by an adhesive label or by molding into the disk hub. The penetrating member 300 may be positioned adjacent to the membrane 110 so as to rupture the membrane when activated. The force detecting sensor 302 may measure any centrifugal force applied to the system as a result of the spinning of the disk, to which the system, through the container, is attached. The sensor 302 may also be configured to measure the sustained duration of any such centrifugal force, frequency or amplitude of vibration, or any other force or motion that may be caused by rotation of the disk at playback speed or higher, which are referred to generally herein as a "kinetic trigger." When the sensor 302 detects a kinetic trigger of sufficient duration, it may signal the actuator 301 which activates the penetrating member 300 which ruptures the membrane.

As used herein, a "kinetic trigger" means the occurrence of a defined condition caused by motion of the disk. For example, if a disk is spun at a rotational speed exceeding a defined threshold, physical conditions such as, for example, force, frequency or amplitude of vibration, strain, acceleration, temperature or frequency of optical pulse impinging in an area of a disk may be sensed and measured. Occurrence of a defined condition may serve as a trigger for activating any suitable data-obscuring device on the disk, such as described herein.

Figure 8:
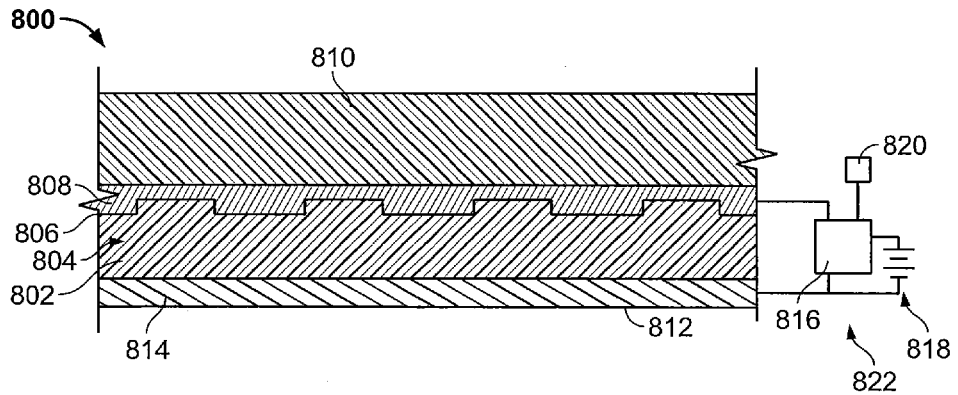
FIG. 8 is a schematic diagram showing a cross-section of an exemplary optical disk with an electro-optical layer.

In other exemplary embodiments, an electro-optical material may be used to obscure some or all of the data encoded on a disk when a kinetic trigger is detected by a sensor on or in the disk. FIG. 8 is a schematic diagram showing an enlarged cross-section (not to scale) of an exemplary optical disk 800 with an electro-optical layer 802 also functioning as a data layer with encoded binary data 804 as pits formed in a substrate material of layer 802. A first surface of layer 802, in which the data 804 is encoded, may be coated with a reflective layer 806, such as a metal layer. An adhesive layer 808 may be used to join the electro-optical layer 802 to a substrate or structural layer 810. Focused laser light for reading encoded data may impinge on a reading surface 812 of the disk 800 and is reflected by metal layer 806. Hence, the reading surface 812 and any layers intervening between the reading surface and the reflective layer 806, such as electro-optical layer 802, should be configured to transmit sufficient laser light to permit reading of encoded data, during normal operation. For example, electro-optical layer 802 may be more than 98% transparent, meaning blocking no more than 2% of transmitted or reflected light, unless activated.

Electro-optical layer 804 may be configured such that, when provided with an electrical signal, transparency of the layer decreases to a point where the encoded data is no longer readable by a typical optical media player. For example, transparency may decrease by 50% or more. Such a material may be referred to as "normally transmissive," because it transmits laser light unless exposed to an electrical signal causing it to become non-transmissive. In the alternative, the electro-optical material may be configured to be normally non-transmissive, meaning that will not transmit laser light until an electrical signal is applied.

The layer 804 may be made, for example, by dispersing an electrochromic material in a carrier substrate, by coating a surface of the electro-chromic layer with an electrochromic material, or by adhering an electrochromic laminate to a surface of the disk. Various suitable electrochromic materials are known in the art, and any suitable material may be used. For example, a suitable electrochromic material may comprise a cyanobiphenyl liquid crystal material in conjunction with polarizing filters, such as used in LCD displays. For further examples, the electrochromic material may comprise a tungsten oxide material, an iridium oxide material, a methylene blue material, a bipyridium salt (viologen) material, or any suitable combination of these or other materials.

Disk 800 may further comprise opposing electrodes, with the electro-optical material interposed between the electrodes. For example, a metallic reflecting layer 806 may also serve as a conductive electrode. A second transparent electrode 814 may be disposed over the electro-optical layer 802. A transparent electrode may be formed by depositing a transparent conductive oxide or nanotube dispersion over a suitable substrate. Transparent conductive coatings may comprise, for example, carbon nanotubes or nanoparticles, and/or gold, silver, tin-doped indium oxide (ITO), or other suitable material. Each electrode may be connected to a controller 816 configured to provide an electrical signal via a circuit 822. The circuit 822 may be powered by a power source 818 and may include a sensor 820 operatively associated with the controller.

The power source 818 may comprise any suitable compact battery, fuel cell, generator or other power source small enough to be incorporated into disk 800 without interfering with normal operation of the disk, while being capable of activating the electro-optical material. To preserve power, controller 816 may include circuitry that activates the electro-optical layer 802 only when the disk is rotated, or only when a kinetic trigger is detected. At other times, the electro-optical material may remain inactivated and transparent. Suitable candidates for power source 818 may include, for example, a flexible thin layer open electrochemical cell as disclosed in U.S. Pat. No. RE39,676; a thin film battery such as disclosed in U.S. Pat. Nos. 5,338,625 or 5,558,957; or a vibration-powered micro-electric generator, such as a piezoelectric generator or device as disclosed in U.S. Pat. No. 7,142,075. A device of the latter type may also serve as a vibration sensor, and thus, for applications where vibration provides a useful kinetic trigger, may also perform the functions of sensor 820 and/or of controller 816.

Controller 816 may comprise a microprocessor, microcontroller or other control device coupled to control timing of an electrical signal provided to the electrodes 806, 814. Controller 816 may be coupled to receive signals from sensor 820 and may be configured to process the signals to determine whether a kinetic trigger has occurred. Upon occurrence of a kinetic trigger, the controller provides an electrical signal to the electrodes. For example, the controller may apply a voltage across the electrodes, and maintain the signal for a defined interval or intervals of time, for so long as the presence of the kinetic trigger is sensed, or for as long as the power source 818 permits, to activate a normally transmissive electro-optical material, thereby rendering it temporarily non-transmissive. The controller may comprise a programmable logic controller and a memory holding a program for processing signals from sensor 820 to recognize a kinetic trigger, and for controlling electrical signals applied to electrodes 806, 814.

In other embodiments, the controller may be configured to apply a voltage or other electrical signal vial electrodes to a normally non-transmissive electro-optical layer. Upon occurrence of a kinetic trigger, the controller may remove the applied voltage or other electrical signal, causing the electro-optical material to assume its normal non-transmissive state.

Sensor 820 may comprise an accelerometer, strain gauge, photocell, thermistor, microphone, antenna or any other sensor or combination of sensors responsive to motion of the optical disk. In some embodiments, the sensor 820 may comprise a strain gauge disposed to sense changes in radial strain related to rotational movement and centripetal force. In other embodiments, a similar function may be performed by an accelerometer directly sensing centripetal force or vibration. A photocell may detect fluctuations in light exposure that may be correlated to disk rotational speed. A filter may be incorporated into circuit 822 between the sensor and controller to filter extraneous signals. Circuit 822 may be formed as an integrated device.

Circuit 822 may be incorporated in a laminated assembly that is applied to the optical disk using a temporary or permanent adhesive. If applied using a temporary adhesive, the electro-optical layer may be configured to be normally non-transmissive, so that if the circuit is removed, the electro-optical layer will become non-transmissive.

Figure 9:
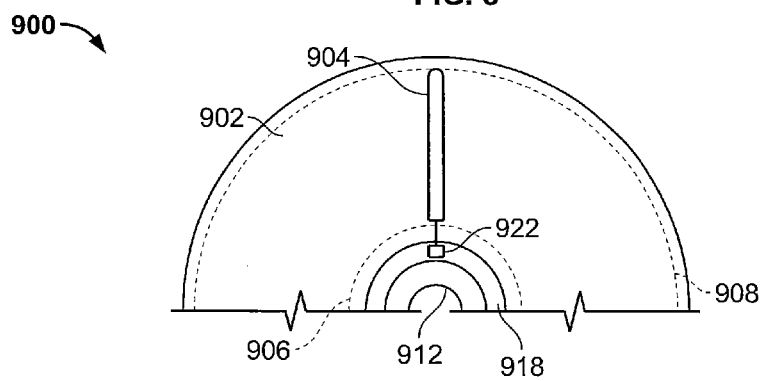
FIG. 9 is a schematic diagram showing a partial plan view of an exemplary disk with an electro-optical layer.

FIG. 9 shows a partial plan view of an exemplary disk 900 with an electro-optical layer. An encoded area 902 of the disk comprises optically encoded data. Electro-optical layer may be provided over all of the encoded area, or over a portion 904 of the encoded area, as shown. A control circuit 922 such as described with reference to circuit 822 above may be provided in a device mounted inside an inner periphery 906 of disk 900. In the alternative, the control circuit or some portion thereof may be placed outside an outer periphery 908 of the disk. A power source 918 may be configured to fit in an annular region between the inner periphery 906 of the encoded area and the hub mounting hole 912. These components may be assembled during manufacture of the disk 900 and incorporated in it. In the alternative, the electrical and electro-optical components may be manufactured as a separate assembly that is applied to a finished disk.

Figure 10:
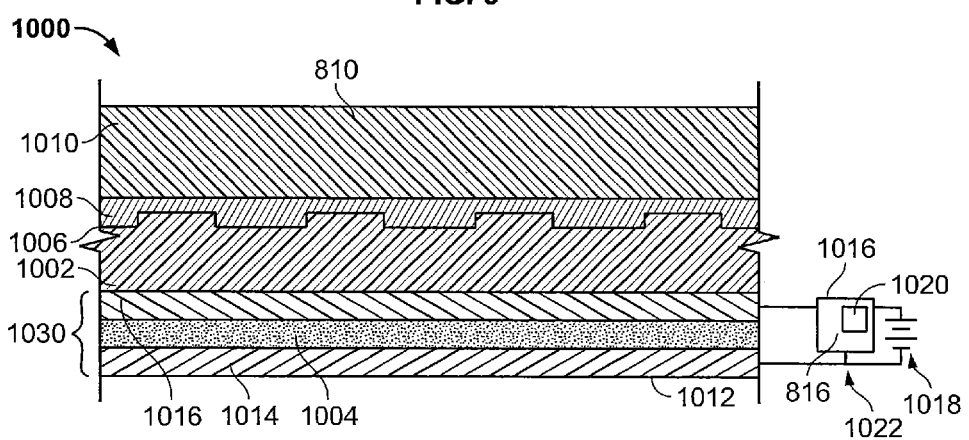
FIG. 10 is a schematic diagram showing a cross-section of an exemplary disk with an electro-optical layer.

In general, in may be desirable to provide the electro-optical layer and functionally related components in a laminated assembly configured to operate as an optical shutter for optical media. A configuration of electrical and electro-optical components as depicted in FIG. 9 may therefore be manufactured as a separate assembly and laminated to an optical disk after its manufacture. FIG. 10 is a schematic diagram showing an enlarged cross-section (not to scale) of an exemplary disk 100 with an electro-optical layer 1004, in a configuration suitable for manufacture as a separate laminated assembly 1030. Data layer 1002, reflective surface 1006, adhesive layer 1008, and lower layer 1010 may comprise conventional components and materials used in optical data disks. Laminated assembly 1030 may be applied to transparent surface of disk 1000 over the encoded substrate 1002. Assembly 1030 may incorporate a control circuit 1022 in a portion of the assembly that is not applied over the encoded substrate. The control circuit may comprise a controller 1016, sensor 1020 and power source 1018 as described above in connection with FIG. 8.

Assembly 1030 may comprise three layers: a first transparent electrode 1016 disposed against encoded substrate 1002; a second transparent electrode 1014 parallel to and disposed over the first electrode, and having an outer reading surface 1012; and an electro-optical layer 1004 interposed between the first and second electrodes. The depicted configuration is merely exemplary, and any suitable assembly providing the function of an optical shutter may be used, for example as used in LCD displays and optical devices. The laminated assembly may be constructed using flexible polymer films laminated together with suitable adhesives or thermally bonded, and may comprise electrochromic and transparent conductive materials as previously described.

According to the foregoing, therefore, an optical disk may be configured with one of the foregoing containers, layers, membranes, or devices configured to render encoded data on the disk unreadable if the disk is spun at an angular velocity substantially greater than a playback angular velocity used for normal reading of the encoded data by an end user device, for example, by a CD player, an DVD player, a HD-DVD player, or a Blu-Ray™ player, to produce an audio-visual output. In an embodiment, the container, layer, membrane or device is configured to render the disk unreadable if the disk angular velocity exceeds the playback angular velocity by at least 50%. In other embodiments, the container, layer, membrane or device may be configured to render the disk unreadable if the disk angular velocity exceeds the playback angular velocity by one of at least 100%, 500%, 1000%, 1500%, 2000%, or 2500%. In the alternative, or in addition, the container, layer, membrane or device may be configured to render the disk unreadable if the disk angular velocity exceeds the playback angular velocity by at least any of the foregoing thresholds or by any amount for a period of time, or by an integral of angular velocity and time. In the alternative, the container, layer, membrane or device may be configured to render the disk unreadable if the disk angular velocity does not exceed the playback angular velocity, but if the integral of angular velocity and time exceeds a defined threshold, to provide a disk that that cannot be spun and remain readable for more than a limited amount of playing time.

Having thus described an embodiment of an optically-readable disk designed to inhibit the copying of the content recorded on it by rendering the disk unreadable at a speed substantially higher than the disk's standard playback speed, it should be apparent to those skilled in the art that certain advantages of the within system have been achieved. It should also be appreciated that various modifications, adaptations, and alternative embodiments thereof may be made within the scope and spirit of the present invention. The invention is defined by the following claims.

What is claimed is:

1. An article comprising:
   a first surface having data optically encoded thereon;
   a second surface transparent to laser light disposed over the first surface;
   an electro-optical material interposed between the second surface and the first surface, the electro-optical material configured to have an optical property responsive to an electrical signal to control access to the data;
   a controller coupled to the electro-optical material and configured to provide the electrical signal in response to sensor input; and
   a sensor coupled to the controller and configured to provide the sensor input to the controller in response to movement of the article.

2. The article of claim 1, further comprising a transparent conducting layer disposed over the electro-optical material and coupled to the controller.

3. The article of claim 2, wherein the transparent conducting layer comprises an indium tin oxide material.

4. The article of claim 2, wherein the transparent conducting layer comprises conductive nanotubes dispersed in a polymer matrix.

5. The article of claim 1, further comprising an electrode disposed adjacent to the electro-optical material and coupled to the controller.

6. The article of claim 1, further comprising an electrical battery coupled to the controller.

7. The article of claim 1, wherein the sensor comprises an accelerometer.

8. The article of claim 1, wherein the sensor comprises a photocell.

9. The article of claim 1, wherein the electro-optical material comprises a liquid crystal material.

10. The article of claim 1, wherein the electro-optical material comprises an electrochromic material.

11. The article of claim 1, wherein the electro-optical material comprises an electrochromic film adhered to a surface of the article over the first surface.

12. The article of claim 11, further comprising an electrode disposed over at least one surface of the electrochromic film.

13. The article of claim 11, wherein the controller and sensor are attached to the electrochromic film.

14. The article of claim 1, wherein the electro-optical material covers less than an entirety of the first surface.

15. The article of claim 1, wherein the optical property of the electro-optical material is selected from the group consisting of: transparency, reflectivity, or color.

16. A laminated assembly configured to operate as an optical shutter for an optical media containing encoded data;
   a first transparent conducting layer configured for bonding to an outer surface of the optical media;
   a second transparent conduction layer disposed parallel to the first transparent conducting layer;
   an electro-optical layer interposed between the first transparent conducting layer and the second transparent conducting layer, the electro-optical layer having at least one optical property responsive to an electrical signal to control optical transmission through the electro-optical layer;
   a controller coupled to the electro-optical material and configured to provide the electrical signal in response to sensor input; and
   a sensor coupled to the controller and configured to provide the sensor input to the controller in response to movement of the laminated assembly.

17. The laminated assembly of claim 16, wherein the controller is configured to process the sensor input to determine the electrical signal response.

18. The laminated assembly of claim 17, wherein the controller is configured to determine a rotational speed value by processing the sensor input.

19. The laminated assembly of claim 18, wherein the controller is configured to provide the electrical signal in response to determining that the rotational speed value exceeds a defined limit.

20. The laminated assembly of claim 17, wherein the electro-optical layer is normally light transmissive, and becomes substantially non-transmissive in response to the electrical signal.

21. The laminated assembly of claim 17, wherein the electro-optical layer is normally non-transmissive to light, and becomes substantially transmissive in response to the electrical signal.

22. The article of claim 1, wherein the controller is configured to process the sensor input to determine the electrical signal response.

23. The article of claim 22, wherein the controller is configured to provide the electrical signal in response to determining that the rotational speed value exceeds a defined limit.

24. The article of claim 23, wherein the controller is configured to provide the electrical signal in response to determining that the rotational speed value exceeds a defined limit.

25. The article of claim 1, wherein the electro-optical material is responsive to the electrical signal to reveal the data.

26. The article of claim 1, wherein the electro-optical material is responsive to the electrical signal to obscure the data.

* * * * *